US008050700B2

(12) United States Patent
Copeland (10) Patent No.: US 8,050,700 B2
(45) Date of Patent: Nov. 1, 2011

(54) NEGOTIATION OF CONTROL OVER A PTT CALL BETWEEN AN OMA POC NETWORK AND A P25 NETWORK (75) Inventor: Aileen T. Copeland, Naperville, IL (US)

(73) Assignee: Alcatel Lucent, Paris (FR)

(*) Notice: Subject to any disclaimer, the term of this patent is extended or adjusted under 35 U.S.C. 154(b) by 946 days.

(21) Appl. No.: 11/769,202

(22) Filed: Jun. 27, 2007

(65) Prior Publication Data
US 2009/0005100 A1 Jan. 1, 2009

(51) Int. Cl.
H04B 7/00 (2006.01)
(52) U.S. Cl. ........................ 455/519; 455/518; 455/90.2
(58) Field of Classification Search .......... 455/517–520, 455/90.2, 78, 79, 500, 426.1, 422.1, 412.1, 455/414.1, 416, 420; 370/352, 389, 338, 370/328
See application file for complete search history.

(56) References Cited

U.S. PATENT DOCUMENTS

| 7,079,857 | B2 * | 7/2006 | Maggenti et al. | 370/447 |
|---|---|---|---|---|
| 2004/0190468 | A1 * | 9/2004 | Saijonmaa | 370/312 |
| 2005/0135374 | A1 * | 6/2005 | Isomaki et al. | 370/395.2 |
| 2006/0031294 | A1 * | 2/2006 | Poikselka | 709/204 |
| 2006/0091294 | A1 * | 5/2006 | Frank et al. | 250/214 B |
| 2006/0153102 | A1 * | 7/2006 | Kuure et al. | 370/263 |
| 2006/0171351 | A1 * | 8/2006 | Wild et al. | 370/328 |
| 2006/0211438 | A1 * | 9/2006 | Sung et al. | 455/518 |
| 2007/0049315 | A1 * | 3/2007 | Luft et al. | 455/518 |
| 2007/0058573 | A1 * | 3/2007 | Schwagmann et al. | 370/260 |
| 2008/0220765 | A1 * | 9/2008 | Chu et al. | 455/422.1 |

* cited by examiner

Primary Examiner — Dominic E Rego
(74) Attorney, Agent, or Firm — Duft Bornsen & Fishman LLP (57) ABSTRACT Communication networks and methods are disclosed for negotiating control over a PTT call between an OMA PoC network and a P25 network. If an OMA PoC PTT server receives a request for the PTT call from a calling party, then the PTT server transmits a call initiation message for the PTT call to the P25 network offering control over the PTT call to a PTT server in the P25 network. The P25 PTT server processes the call initiation message to identify the offer for control, assumes control over the PTT call, and determines whether the calling or called party has the floor for initial transmission for the PTT call. The P25 PTT server then transmits a response message to the OMA PoC PTT server indicating which one of the calling or called party has the floor. The party granted the floor may then initiate voice communications for the PTT call.

20 Claims, 5 Drawing Sheets

NEGOTIATION OF CONTROL OVER A PTT CALL BETWEEN AN OMA POC NETWORK AND A P25 NETWORK

BACKGROUND OF THE INVENTION

1. Field of the Invention

The invention is related to the field of communication networks and, in particular, to negotiating for control over a Push-to-Talk (PTT) call between an Open Mobile Alliance (OMA) Push-to-Talk over cellular (PoC) network and a Project (P25) network.

2. Statement of the Problem

Push-to-Talk (PTT) over Cellular (PoC) is a walkie-talkie type service that is provided over a cellular phone network. PTT calls are half duplex communications meaning that voice communications are transmitted one way from a speaking party to one or more listening parties, as opposed to a two-way transmission between the speaking party and the listening parties. To place a PTT call, the speaking party pushes a button on his/her mobile device, and the mobile device transmits a PTT call request to the PoC network. The PoC network grants the speaking party the floor for the call, and the mobile device is permitted to transmit voice communications to the listening parties. While the speaking party has the floor, the PoC network does not permit the listening parties to transmit voice communications to the speaking party because of the half duplex connection. After the speaking party is done talking, a listening party may then obtain the floor from the PoC network to respond to the speaking party.

The Open Mobile Alliance (OMA) is a standards body that defines standards for PoC networks (other proprietary standards also exist). The OMA PoC standards set forth rules for assigning control over initial transmission for PTT calls within the PoC network. A PoC network comprises one or more PTT servers that serve PTT calls. The OMA PoC standards define which PTT server is granted control, and the controlling PTT server determines which party is granted the floor for a PTT call. The controlling PTT server forwards voice communications from the party having the floor, and discards any voice communications from other parties to the PTT call that do not have the floor.

Project 25 (P25) is a suite of standards for digital radio communications for use by federal, state/province, and local public safety agencies in North America to enable them to communicate with other agencies and mutual aid response teams in emergencies. P25 was established to address the need for common digital public safety radio communications standards for first responders and Homeland Security/Emergency Response professionals. The P25 suite of standards involves digital Land Mobile Radio (LMR) services commonly used by police, first responders, and other public safety organizations.

It may be desirable for P25-compliant LMR devices to communicate with mobile devices of an OMA PoC network for PTT calls. The P25 suite includes the Inter-Subsystem Interface (ISSI) which defines the interface between Radio Frequency (RF) subsystems and wide area networks, such as an OMA PoC network. Like the OMA PoC standards, the ISSI standards set forth rules for assigning control over initial transmission for PTT calls within the P25 network. The PTT server in a P25 network is referred to as the Radio Frequency Subsystem (RFSS). The ISSI standards define which RFSS is granted control, and the controlling RFSS determines which party is granted the floor for a PTT call.

Problems would be encountered when a one-to-one PTT call is placed from an OMA PoC network to a P25 network. According to the OMA PoC standards, the PTT server that is serving the calling party for a PTT call is assigned as the controlling PTT server. According to P25 ISSI standards, the RFSS that is serving the called party for a PTT call is assigned as the controlling PTT server. Thus, when a call is established from a calling party in an OMA PoC network to a called party in a P25 network, both the PTT server in the OMA PoC network and the RFSS in the P25 network assume the role of controlling server. The PTT server in the OMA PoC network grants the calling party the floor for initial transmission for the PTT call, while at the same time the RFSS in the P25 network grants the called party the floor for initial transmission. When a voice communication from the called party reaches the PTT server in the OMA PoC network, the PTT server discards the communication because the called party doesn't have the floor in the OMA PoC network. Likewise, when a voice communication from the calling party reaches the RFSS in the P25 network, the RFSS discards the communication because the calling party doesn't have the floor in the P25 network. Due to the conflict between the OMA PoC and P25 ISSI standards, no voice communications are exchanged between the parties resulting in a communication breakdown.

SUMMARY OF THE SOLUTION

Embodiments of the invention solve the above and other related problems by providing for negotiation between an OMA PoC network and a P25 network as to which PTT server is in control for a PTT call between the networks. When a PTT call is placed from an OMA PoC network to a P25 network, the PTT server in the OMA PoC network does not automatically assume the role of controlling server. Instead, the PTT server in the OMA PoC network defers control to the PTT server in the P25 network. According to the more rigid rules of the P25 ISSI standards, the PTT server in the P25 network assumes the role of controlling server for the PTT call. As the controlling server, the PTT server in the P25 network determines which party is granted the floor for initial transmission for the PTT call. The PTT server in the P25 network then informs the PTT server in the OMA PoC network as to which party has the floor.

By having the PTT server in the OMA PoC network defer control to the PTT server in the P25 network, the conflict between the OMA PoC standards and the P25 ISSI standards is advantageously resolved. If the calling party is granted the floor by the PTT server in the P25 network, then the calling party may transmit voice communications, and the PTT server in the P25 network will not discard the communications. Likewise, if the called party is granted the floor by the PTT server in the P25 network, then the called party may transmit voice communications, and the PTT server in the OMA PoC network will not discard the communications. The calling party and the called party will be allowed to communicate as desired.

One embodiment includes a communication network comprising an OMA PoC network and a P25 network. The OMA PoC network includes a first PTT server adapted to serve a calling party, and the P25 network includes a second PTT server adapted to serve a called party. This embodiment illustrates a PTT call from the calling party of the OMA PoC network to the called party of the P25 network.

For the PTT call, the first PTT server receives a request for the PTT call from the calling party, and generates a call initiation message for the PTT call. The call initiation message includes an offer for control over the PTT call to the second PTT server of the P25 network. The first PTT server then transmits the call initiation message to the second PTT server.

The second PTT server receives the call initiation message for the PTT call, and processes the call initiation message to identify the offer for control over the PTT call. Responsive to identifying the offer, the second PTT server assumes control over the PTT call and determines whether the calling party or the called party has the floor for initial transmission for the PTT call. The second PTT server then generates a response message that includes an indication as to which one of the calling party or the called party has the floor for initial transmission, and transmits the response message to the first PTT server. The party that was issued the floor may then initiate voice communications for the PTT call.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
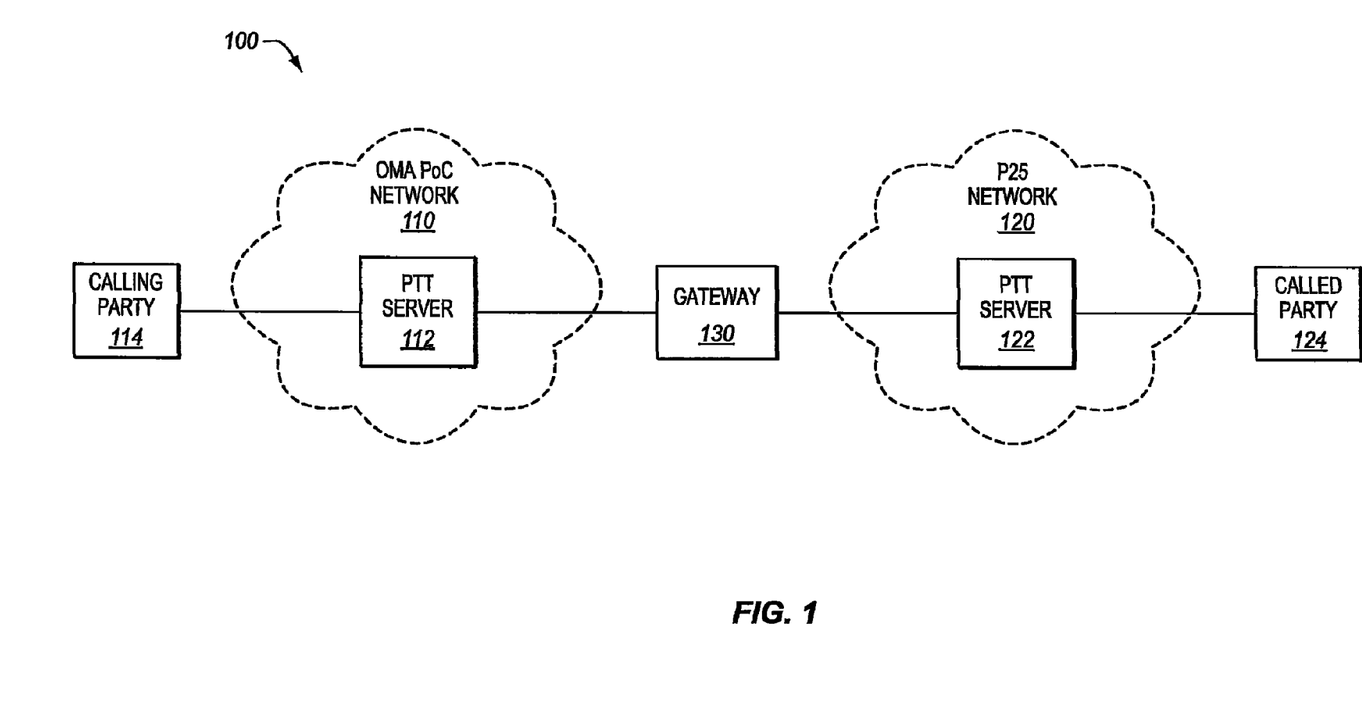
FIG. 1 illustrates a communication network in an exemplary embodiment of the invention.

FIG. 1 illustrates a communication network 100 in an exemplary embodiment of the invention. Communication network 100 includes an OMA PoC network 110, a P25 network 120, and a gateway 130 between the networks. OMA PoC network 110 includes at least one PTT server 112 that is adapted to serve a calling party 114 for a PTT call. PTT server 112 comprises any server, application, or other system adapted to setup, maintain, and tear down PTT calls according to OMA PoC standards. P25 network 120 includes at least one PTT server 122 that is adapted to serve a called party 124 for a PTT call. PTT server 122 comprises any server, application, or other system adapted to setup, maintain, and tear down PTT calls according to P25 standards, or more particularly P25 ISSI standards. PTT server 122 may also be referred to as a Radio Frequency Subsystem (RFSS).

Gateway 130 comprises any server, application, or other system adapted to convert messages between a protocol supported by OMA PoC network 110 and a protocol supported by P25 network 120. For instance, OMA PoC network 110 may support a full message set of Session Initiation Protocol (SIP) while P25 network 120 may only support a subset of SIP. Gateway 130 is able to convert between the messages sets of both networks. If OMA PoC network 110 and P25 network 120 support the same messaging protocol, then gateway 130 is not needed.

Assume for this embodiment that calling party 114 initiates a PTT call to called party 124 by transmitting a PTT call request to PTT server 112 in OMA PoC network 110. The following flow charts illustrate how control over the PTT call is negotiated between OMA PoC network 110 and P25 network 120.

Figure 2:
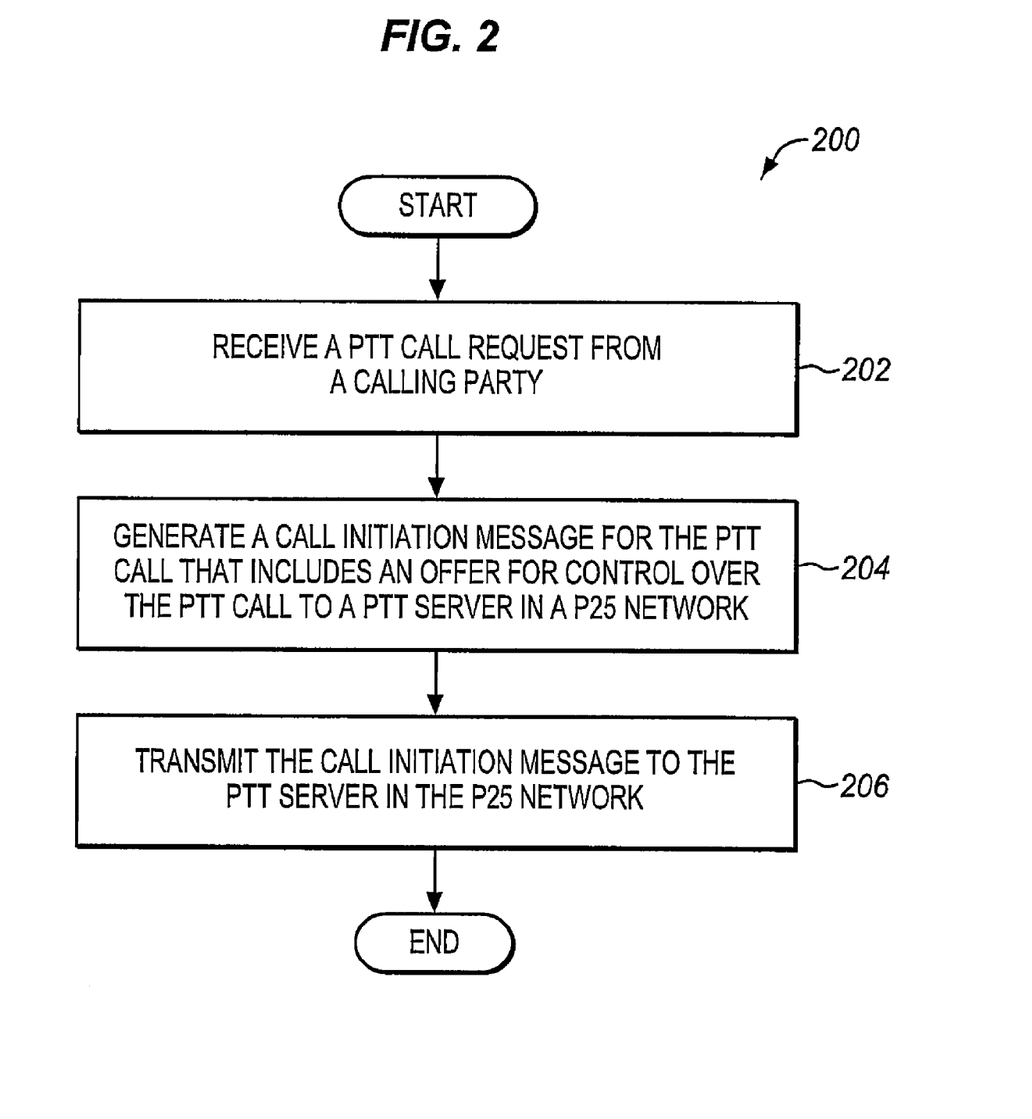
FIG. 2 is a flow chart illustrating a method of operating a PTT server in an OMA PoC network in an exemplary embodiment of the invention.

FIG. 2 is a flow chart illustrating a method 200 of operating PTT server 112 in OMA PoC network 110 in an exemplary embodiment of the invention. The steps of method 200 will be described with reference to communication network 100 in FIG. 1. The steps of the flow chart in FIG. 2 are not all inclusive and may include other steps not shown.

In step 202 of method 200, PTT server 112 receives the PTT call request from calling party 114. In step 204, PTT server 112 generates a call initiation message for the PTT call. PTT server 112 includes an offer for control over the PTT call to PTT server 122 in the call initiation message. As an example, PTT server 112 may generate a SIP INVITE message for call initiation. In generating the SIP INVITE message, PTT server 112 may format a Session Description Protocol (SDP) parameter in the INVITE message to indicate the offer for control over the PTT call. For instance, the SDP parameter that is used for the offer may comprise the "tb_granted" parameter. A "tb_granted" value of "1" may indicate an offer for control over the PTT call. A "tb_granted" value of "0" may indicate that PTT server 112 is assuming control over the PTT call. Other SDP parameters may alternatively be used for the offer. In step 206, PTT server 112 transmits the call initiation message to PTT server 122.

If OMA PoC network 110 and P25 network 120 do not support the same messaging protocol, then PTT server 112 transmits the call initiation message to gateway 130. Responsive to receiving the call initiation message, gateway 130 identifies the network address for PTT server 122. Gateway 130 also identifies the protocols supported by each of OMA PoC network 110 and P25 network 120. Gateway 130 then converts the call initiation message from the protocol supported by OMA PoC network 110 to the protocol supported by P25 network 120. For example, assume that the call initiation message comprises a SIP INVITE message and that the INVITE message includes an offer for control over the PTT call in the form of the "tb_granted" parameter having the value of "1". The "tb_granted" parameter may indicate that PTT server 112 offers to act as a participating PTT server rather than a controlling PTT server. Gateway 130 may identify that P25 network 120 does not support the full SIP message set, which includes the "tb_granted" parameter. Gateway 130 may then convert the offer in the SDP portion of the INVITE message to another parameter that is supported by P25 network 120.

Figure 3:
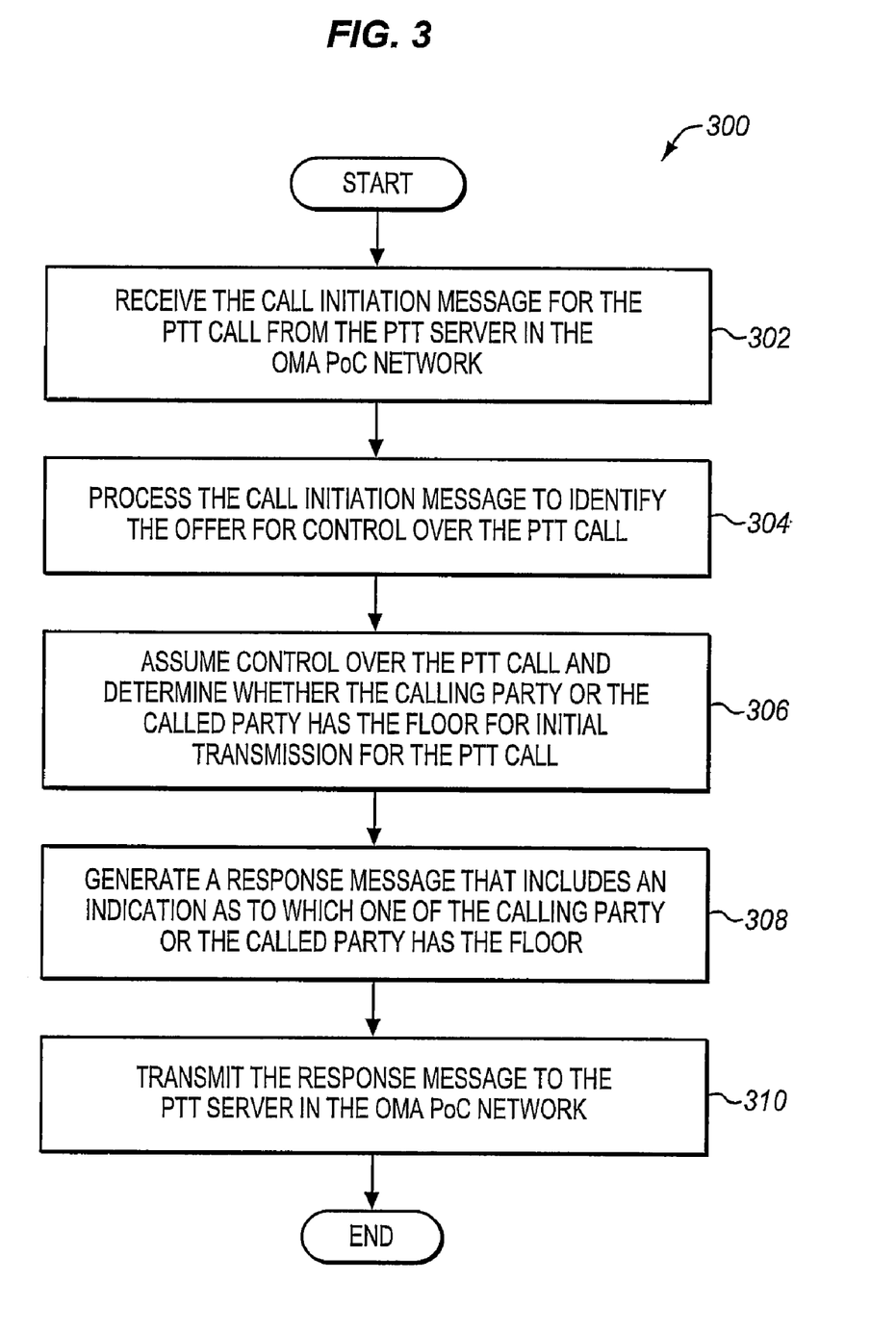
FIG. 3 is a flow chart illustrating a method of operating a PTT server in a P25 network in an exemplary embodiment of the invention.

FIG. 3 is a flow chart illustrating a method 300 of operating PTT server 122 in P25 server 120 in an exemplary embodiment of the invention. The steps of method 300 will be described with reference to communication network 100 in FIG. 1. The steps of the flow chart in FIG. 3 are not all inclusive and may include other steps not shown.

In step 302 of method 300, PTT server 122 receives the call initiation message for the PTT call from PTT server 112. In step 304, PTT server 122 processes the call initiation message to identify the offer for control over the PTT call. Responsive to identifying the offer, PTT server 122 assumes control over the PTT call, and determines whether calling party 114 or called party 124 has the floor for initial transmission for the PTT call in step 306. PTT server 122 then generates a response message that includes an indication as to which one of calling party 114 or called party 124 has the floor for initial transmission in step 308. As an example, PTT server 122 may generate a SIP 200 OK message for the response message. In generating the 200 OK message, PTT server 122 may format an SDP parameter in the 200 OK message to indicate which one of calling party 114 or called party 124 has the floor for initial transmission. For instance, the SDP parameter that is used for the floor indication may comprise the "C-I" parameter. A "C-I" value of "1" may indicate that called party 124 has been granted the floor, while a "C-I" value of "0" may indicate that calling party 114 has been granted the floor. Other SDP parameters may alternatively be used for the floor indication. In step 310, PTT server 122 transmits the response message to PTT server 112.

Again, if OMA PoC network 110 and P25 network 120 do not support the same messaging protocol, then PTT server 122 transmits the response message to gateway 130. Responsive to receiving the response message, gateway 130 converts the response message from the protocol supported by P25 network 120 to the protocol supported by OMA PoC network 110. For example, assume that the response message comprises a SIP 200 OK message and that the 200 OK message includes a floor indication in the form of the "C-I" parameter having the value of "1". Gateway 130 may identify that OMA PoC network 110 supports a larger SIP message set than P25 network 120. Gateway 130 may then convert the floor indication in the SDP portion of the 200 OK message from the "C-I" parameter to another parameter such as the "tb_granted" parameter.

PTT server 112 then processes the response message to identify which one of calling party 114 or called party 124 has the floor. If calling party 114 has been granted the floor, then PTT server 112 transmits a message to calling party 114 indicating that the floor has been granted, and calling party 114 may initiate the transmission of voice communications. If called party 124 has been granted the floor, then PTT server 122 transmits a message to called party 124 indicating that the floor has been granted, and called party 124 may initiate the transmission of voice communications.

Figure 4:
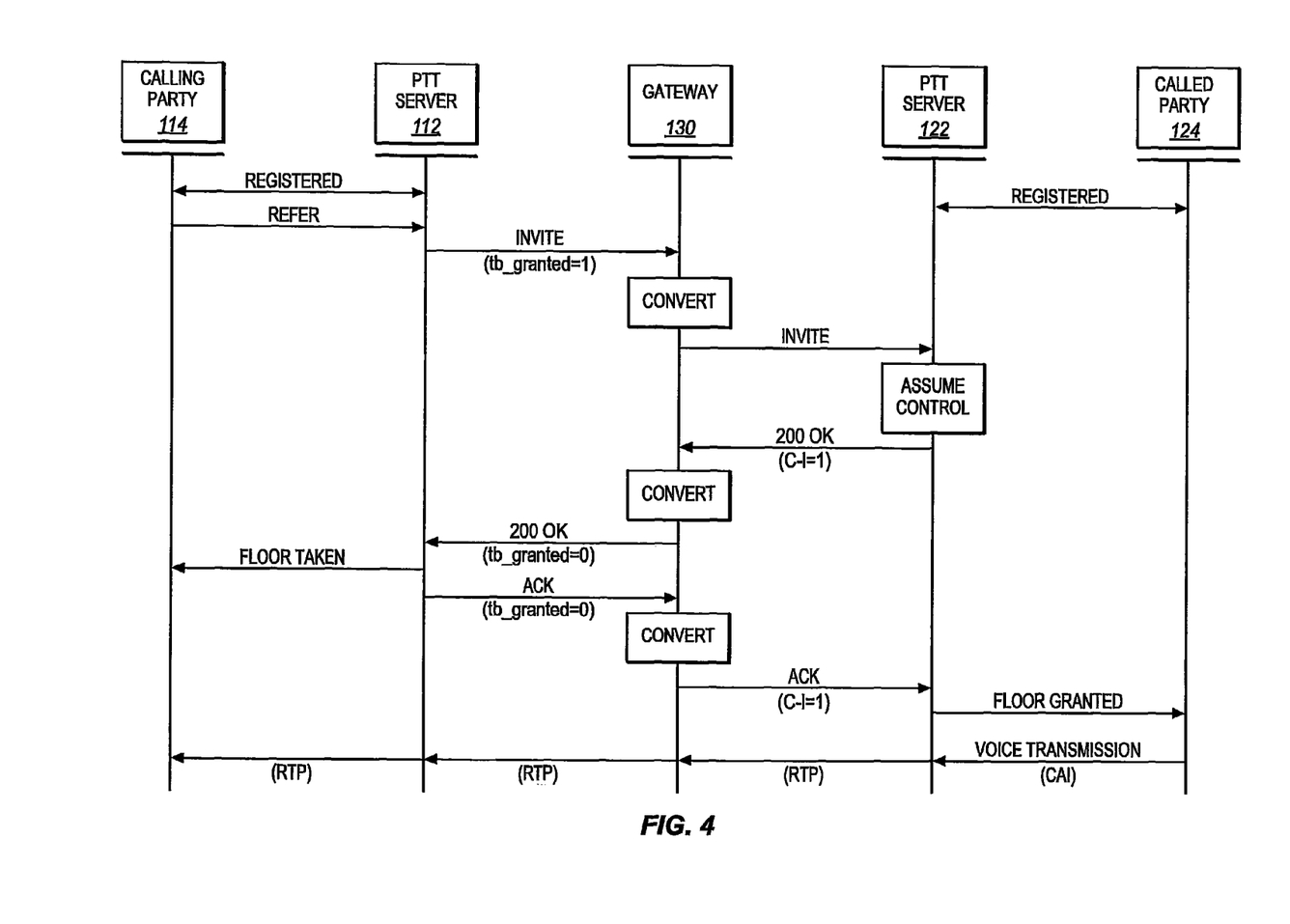
FIG. 4 is a message diagram illustrating the scenario where a called party is granted the floor for a PTT call in an exemplary embodiment of the invention.
Figure 5:
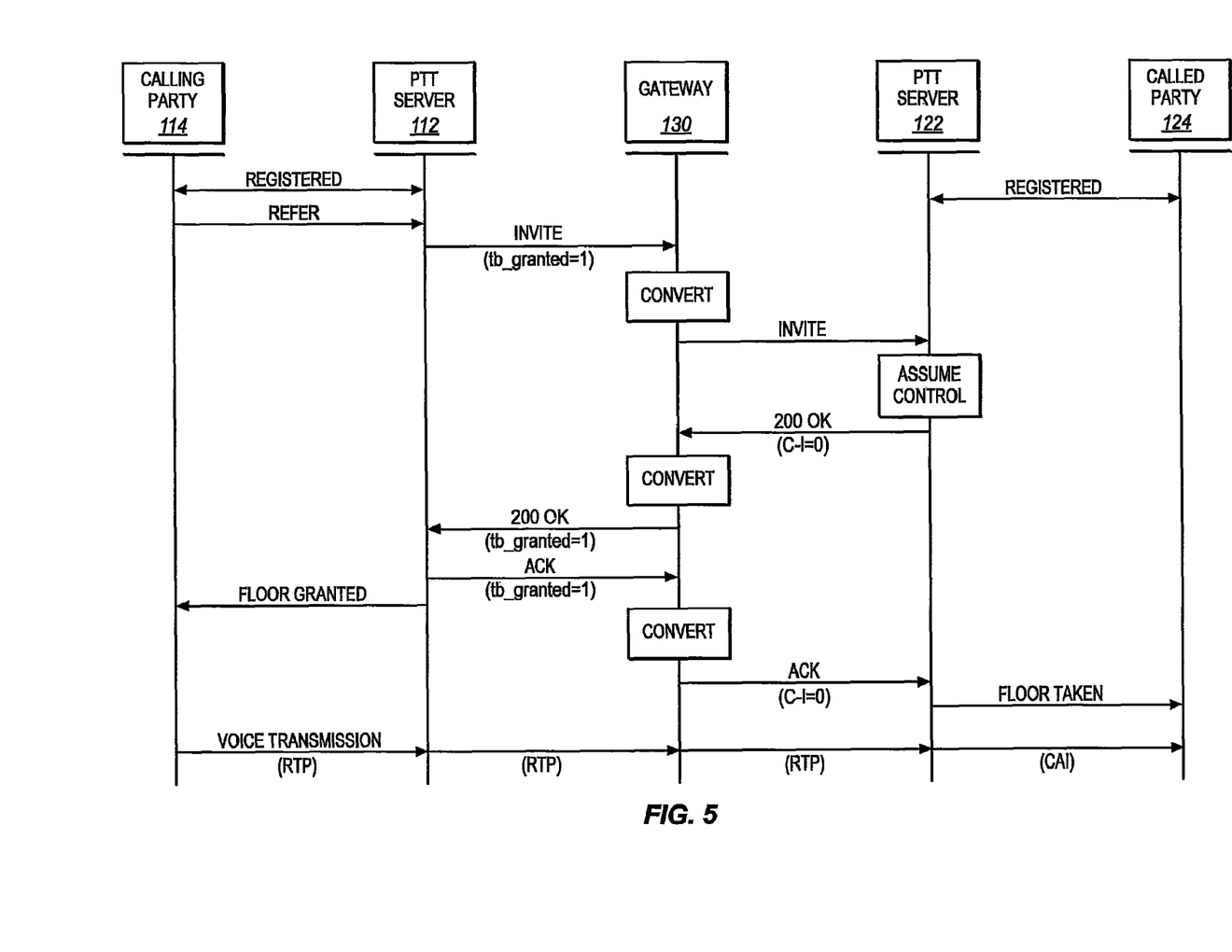
FIG. 5 is a message diagram illustrating the scenario where a calling party is granted the floor for a PTT call in an exemplary embodiment of the invention.

FIGS. 4-5 illustrate exemplary scenarios of negotiating control of a PTT call between OMA PoC network 110 and P25 network 120, and granting the floor to calling party 114 or called party 124. FIG. 4 is a message diagram illustrating the scenario where called party 124 is granted the floor in an exemplary embodiment of the invention. The message diagram illustrates SIP messaging used between OMA PoC network 110 and P25 network 120. One assumption in the message diagram of FIG. 4 is that calling party 114 has registered with PTT server 112 and that called party 124 has registered with PTT server 122.

To begin, calling party 114 generates a SIP REFER message, and transmits the REFER message to PTT server 112. The REFER message comprises the request for a PTT call from calling party 114 to called party 124. Responsive to the REFER message, PTT server 112 generates a SIP INVITE message for the PTT call. PTT server 112 includes an offer for control over the PTT call to PTT server 122 in the INVITE message. In this embodiment, PTT server 112 formats the SDP "tb_granted" parameter in the INVITE message to indicate the offer for control over the PTT call. The "tb_granted" parameter is given a value of "1" to indicate the offer for control over the PTT call. PTT server 112 then transmits the INVITE message to gateway 130.

Gateway 130 identifies the network address for PTT server 122. Gateway 130 also identifies the protocols supported by each of OMA PoC network 110 and P25 network 120. Gateway 130 then converts the INVITE message from the protocol supported by OMA PoC network 110 to the protocol supported by P25 network 120. In the conversion, gateway 130 strips off the "tb_granted" parameter but notes in the INVITE message that OMA PoC network 110 is deferring control of the initial floor grant to P25 network 120. Gateway 130 then forwards the INVITE message to PTT server 122.

Responsive to receiving the INVITE message, PTT server 122 processes the INVITE message to identify the offer for control over the PTT call included in the SDP portion of the INVITE message. PTT server 122, according to the P25 ISSI rules, assumes control over the PTT call. PTT server 122 then determines whether calling party 114 or called party 124 has the floor for initial transmission for the PTT call. In this example, PTT server 122 determines that called party 124 has the floor for initial transmission. PTT server 122 then generates a SIP 200 OK message that includes an indication that called party 124 has the floor. In this embodiment, PTT server 122 formats the SDP "C-I" parameter indicating that called party 124 has the floor for initial transmission. The "C-I" parameter is given a value of "1" to indicate that called party 124 has been granted the floor. PTT server 122 then transmits the 200 OK message to gateway 130.

Responsive to receiving the 200 OK message, gateway 130 converts the 200 OK message from the protocol supported by P25 network 120 to the protocol supported by OMA PoC network 110. In the conversion, gateway 130 converts the "C-I" parameter having a value of "1" to a "tb_granted" parameter having the value of "0". The "tb_granted" parameter of "0" indicates to PTT server 112 that PTT server 122 has granted called party 124 the floor for initial transmission for the PTT call. Gateway 130 then forwards the 200 OK message to PTT server 112.

PTT server 112 processes the 200 OK message to identify which party has the floor for the PTT call as indicated in the SDP portion of the 200 OK message. In this example, PTT server 122 has granted called party 124 the floor, so PTT server 112 transmits a message (e.g., a Talk Burst Taken message in Talk Burst Control Protocol (TBCP)) indicating that the floor has been taken by called party 124.

PTT server 112 also transmits a SIP ACK message to PTT server 122 acknowledging the floor grant to called party 124. Responsive to the ACK message, PTT server 122 transmits a message to called party 124 indicating that the floor has been granted to called party 124. Called party 124 may then initiate voice transmission through the appropriate protocols, such as the Common Air Interface (CAI) and Real Time protocol (RTP).

FIG. 5 is a message diagram illustrating the scenario where calling party 114 is granted the floor in an exemplary embodiment of the invention. As in FIG. 4, calling party 114 generates a SIP REFER message, and transmits the REFER message to PTT server 112. Responsive to the REFER message, PTT server 112 recognizes that called party 124 is in a non-OMA PoC network and generates a SIP INVITE message for the PTT call that includes an offer for control over the PTT call. In this embodiment, PTT server 112 formats the SDP "tb_granted" parameter in the INVITE message to indicate the offer for control over the PTT call. The "tb_granted"

parameter is given a value of "1" to indicate the offer for control over the PTT call. PTT server 112 then transmits the INVITE message to gateway 130.

Gateway 130 identifies the network address for PTT server 122. Gateway 130 also identifies the protocols supported by each of OMA PoC network 110 and P25 network 120. Gateway 130 then strips off the "tb_granted" parameter but notes in the INVITE message that OMA PoC network 110 is deferring control of the initial floor grant to P25 network 120. Gateway 130 then forwards the INVITE message to PTT server 122.

Responsive to receiving the INVITE message, PTT server 122 processes the INVITE message to identify the offer for control over the PTT call included in the SDP portion of the INVITE message. PTT server 122, according to the P25 ISSI rules, assumes control over the PTT call. PTT server 122 then determines whether calling party 114 or called party 124 has the floor for initial transmission for the PTT call. In this example, PTT server 122 determines that calling party 114 has the floor for initial transmission. PTT server 122 then generates a SIP 200 OK message that includes an indication that calling party 114 has the floor. In this embodiment, PTT server 122 formats the SDP "C-I" parameter indicating that calling party 114 has the floor for initial transmission. The "C-I" parameter is given a value of "0" to indicate that calling party 114 has been granted the floor. PTT server 122 then transmits the 200 OK message to gateway 130.

Responsive to receiving the 200 OK message, gateway 130 converts the 200 OK message from the protocol supported by P25 network 120 to the protocol supported by OMA PoC network 110. In the conversion, gateway 130 converts the "C-I" parameter having a value of "0" to a "tb_granted" parameter having the value of "1". The "tb_granted" parameter of "1" indicates to PTT server 112 that PTT server 122 has granted calling party 114 the floor for initial transmission for the PTT call. Gateway 130 then forwards the 200 OK message to PTT server 112.

PTT server 112 processes the 200 OK message to identify which party has the floor for the PTT call. PTT server 112 transmits a SIP ACK message to PTT server 122 acknowledging the floor grant to calling party 114. Responsive to the ACK message, PTT server 122 transmits a message to called party 124 indicating that the floor has been taken.

In this example, PTT server 122 has granted calling party 114 the floor, so PTT server 112 transmits a message (e.g., a Talk Burst Granted message in TBCP) indicating that the floor has been granted to calling party 114. Calling party 114 may then initiate voice transmission through the appropriate protocols, such as the Real Time protocol (RTP) and the Common Air Interface (CAI).

By having PTT server 112 in OMA PoC network 110 defer control to PTT server 122 in P25 network 120, the conflict between the OMA PoC standards and the P25 ISSI standards is advantageously resolved. PTT calls from OMA PoC network 110 may be placed to P25 network 120 without communications breaking as presently occurs.

Although OMA PoC networks and P25 networks are described herein, the process of negotiating control over a PTT call applies to other types of PTT networks. Other PTT networks may have different rules for assigning control over PTT calls that create a conflict over the controlling server much like the conflict presently exists between OMA PoC networks and P25 networks. For instance, a first PTT network serving a calling party may have a pre-defined rule that the PTT network serving the calling party for a PTT call has control over the PTT call, and a second PTT network serving a called party may have a pre-defined rule that the PTT network serving the called party has control over the PTT call. Examples of networks that may have different rules for assigning control may include a proprietary network and a P25 network, an OMA PoC network and a proprietary network, or two different proprietary networks. If such a conflict exists between two PTT networks involved in a PTT call, then the process of negotiating control over the PTT call as described herein may be used to resolve the conflict.

Although specific embodiments were described herein, the scope of the invention is not limited to those specific embodiments. The scope of the invention is defined by the following claims and any equivalents thereof.

I claim:

1. A communication network, comprising:
   an Open Mobile Alliance (OMA) Push-to-Talk over cellular (PoC) network having a first Push-to-Talk (PTT) server adapted to serve a calling party;
   a Project 25 (P25) network having a second PTT server adapted to serve a called party;
   the first PTT server adapted to receive a request for a PTT call from the calling party to the called party, to generate a call initiation message for the PTT call that includes an offer for control over the PTT call to the second PTT server, and to transmit the call initiation message to the second PTT server; and
   the second PTT server adapted to receive the call initiation message for the PTT call, to process the call initiation message to identify the offer for control over the PTT call, to determine whether the calling party or the called party has the floor for initial transmission for the PTT call responsive to identifying the offer, to generate a response message that includes an indication as to which one of the calling party or the called party has the floor for initial transmission, and to transmit the response message to the first PTT server.

2. The communication network of claim 1 further comprising:
   a gateway between the first PTT server and the second PTT server adapted to convert the call initiation message from a protocol supported by the first PTT server to a protocol supported by the second PTT server, and to convert the response message from the protocol supported by the second PTT server to the protocol supported by the first PTT server.

3. The communication network of claim 1 wherein:
   the call initiation message comprises a Session Initiation Protocol (SIP) INVITE message; and
   the offer for control over the PTT call comprises a Session Description Protocol (SDP) parameter indicating that the first PTT server offers to act as a participating PTT server rather than a controlling PTT server.

4. The communication network of claim 3 wherein the SDP parameter comprises a "tb_granted" parameter indicating that the first PTT server offers to act as a participating PTT server rather than a controlling PTT server.

5. The communication network of claim 1 wherein:
   the response message comprises a Session Initiation Protocol (SIP) 200 OK message; and
   the indication as to which one of the calling party or the called party has the floor for initial transmission comprises a Session Description Protocol (SDP) parameter indicating which one of the calling party or the called party has the floor for initial transmission.

6. The communication network of claim 5 wherein the SDP parameter comprises a "C-I" parameter indicating which one of the calling party or the called party has the floor for initial transmission.

7. A method of operating an Open Mobile Alliance (OMA) Push-to-Talk over cellular (PoC) network having a first Push-to-Talk (PTT) server adapted to serve a calling party and a Project 25 (P25) network having a second PTT server adapted to serve a called party, the method comprising:
- receiving a request for a PTT call from the calling party to the called party in the first PTT server;
- generating a call initiation message for the PTT call in the first PTT server that includes an offer for control over the PTT call to the second PTT server;
- transmitting the call initiation message from the first PTT server to the second PTT server;
- processing, in the second PTT server, the call initiation message to identify the offer for control over the PTT call;
- determining whether the calling party or the called party has the floor for initial transmission for the PTT call responsive to identifying the offer;
- generating a response message that includes an indication as to which one of the calling party or the called party has the floor for initial transmission; and
- transmitting the response message from the second PTT server to the first PTT server.

8. The method of claim 7 further comprising:
- converting the call initiation message from a protocol supported by the first PTT server to a protocol supported by the second PTT server; and
- converting the response message from the protocol supported by the second PTT server to the protocol supported by the first PTT server.

9. The method of claim 7 wherein:
- the call initiation message comprises a Session Initiation Protocol (SIP) INVITE message; and
- the offer for control over the PTT call comprises a Session Description Protocol (SDP) parameter indicating that the first PTT server offers to act as a participating PTT server rather than a controlling PTT server.

10. The method of claim 9 wherein the SDP parameter comprises a "tb_granted" parameter indicating that the first PTT server offers to act as a participating PTT server rather than a controlling PTT server.

11. The method of claim 7 wherein:
- the response message comprises a Session Initiation Protocol (SIP) 200 OK message; and
- the indication as to which one of the calling party or the called party has the floor for initial transmission comprises a Session Description Protocol (SDP) parameter indicating which one of the calling party or the called party has the floor for initial transmission.

12. The method of claim 11 wherein the SDP parameter comprises a "C-I" parameter indicating which one of the calling party or the called party has the floor for initial transmission.

13. A communication network, comprising:
- a first Push-to-Talk (PTT) network and a second PTT network having different rules for assigning control over PTT calls;
- the first PTT network adapted to receive a request for a PTT call from a calling party to a called party, and to transmit a call initiation message for the PTT call to the second PTT network that includes an offer for control over the PTT call to the second PTT network; and
- the second PTT network adapted to receive the call initiation message for the PTT call, to process the call initiation message to identify the offer for control over the PTT call, to determine whether the calling party or the called party has the floor for initial transmission for the PTT call responsive to identifying the offer, and to transmit a response message to the first PTT network that includes an indication as to which one of the calling party or the called party has the floor for initial transmission.

14. The communication network of claim 13 wherein the second PTT network has a pre-defined rule that the PTT network serving the called party for a PTT call has control over the PTT call.

15. The communication network of claim 13 wherein:
- the first PTT network comprises an Open Mobile Alliance (OMA) Push-to-Talk over cellular (PoC) network; and
- the second PTT network comprises a Project 25 (P25) network.

16. The communication network of claim 13 further comprising:
- a gateway between the first PTT network and the second PTT network adapted to convert the call initiation message from a protocol supported by the first PTT network to a protocol supported by the second PTT network, and to convert the response message from the protocol supported by the second PTT network to the protocol supported by the first PTT network.

17. The communication network of claim 13 wherein:
- the call initiation message comprises a Session Initiation Protocol (SIP) INVITE message; and
- the offer for control over the PTT call comprises a Session Description Protocol (SDP) parameter.

18. The communication network of claim 17 wherein the SDP parameter comprises a "tb_granted" parameter.

19. The communication network of claim 13 wherein:
- the response message comprises a Session Initiation Protocol (SIP) 200 OK message; and
- the indication as to which one of the calling party or the called party has the floor for initial transmission comprises a Session Description Protocol (SDP) parameter.

20. The communication network of claim 19 wherein the SDP parameter comprises a "C-I" parameter.

* * * * *